Nov. 10, 1953  W. F. HUCK  2,658,424

MILLING MACHINE

Filed Jan. 25, 1949

INVENTOR.
WILLIAM F. HUCK,
BY
Fred C. Pethick,
ATTORNEY.

Patented Nov. 10, 1953

2,658,424

UNITED STATES PATENT OFFICE 2,658,424

MILLING MACHINE

William F. Huck, Forest Hills, N. Y., assignor to Huck Co., New York, N. Y., a partnership composed of William F. Huck, Alexander J. Albrecht, and Stephan S. Wekeman Application January 25, 1949, Serial No. 72,631

7 Claims. (Cl. 90—16)

My present invention relates to milling machines, and more particularly to milling machines that are used for machining the rear surfaces of flat printing plates.

In order to produce high grade printed matter it is important that printing plates be accurately formed. One of the operations performed on flat printing plates is to mill or machine the rear surface of the plates. This operation must be performed with a high degree of accuracy in order that the finished plate will be of exactly the correct thickness at all points across the plate, and so that the rear surface will be perfectly smooth. furthermore it is important that the milling machine used be capable of accurate and swift adjustment and that it be constructed in such a manner that the milling cutter can be readily removed and replaced.

Machines now in general use, for the above stated purpose, present decided disadvantages, inasmuch as in the past inaccuracies have resulted from the inability of the machines to maintain the required accuracy. Also it has been difficult and inconvenient to adjust such machines so that they would cut evenly across the plates from one end to the other. Furthermore, it has been difficult to accurately install a new cutting unit. Therefore, in view of the disadvantages which attend the use of the ordinary type of printing plate milling machine, my present invention has as one of its objects to provide an assemblage of parts that will form an improved milling machine that is capable of milling the rear surface of a flat printing plate to a high degree of accuracy.

Another object of my invention is to provide an improved milling machine that is capable of rapidly producing flat printing plates that are exactly the same thickness at every point across the plate.

A further object of my invention is to provide an improved milling machine for printing plates that can be quickly set to mill a flat printing plate to any desired thickness.

A still further object of my invention is to provide a milling machine for flat printing plates, in which the milling cutter can be quickly and easily removed, and accurately replaced.

Other important objects of my invention will be apparent from the following description and appended claims.

Figure 1:
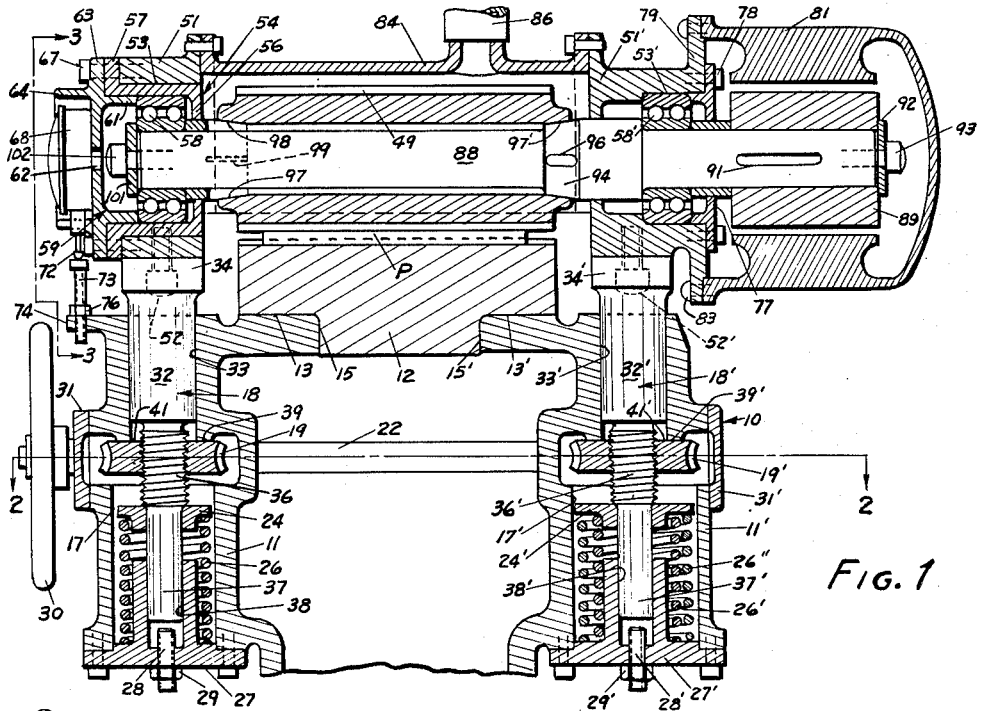
Figure 2:
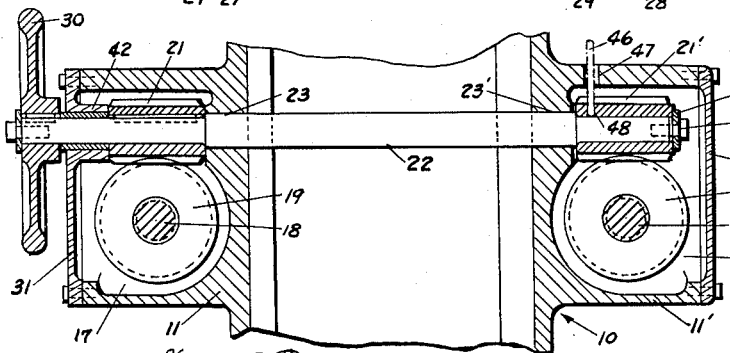
Figure 3:
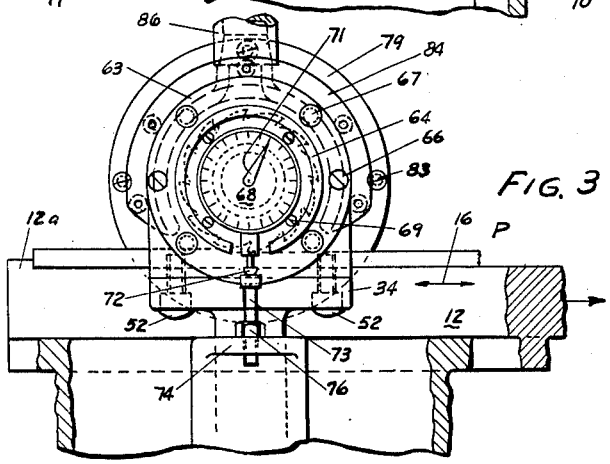

A complete understanding of my invention can be had by reference to the attached drawings and the following description. On the drawings:

Fig. 1 is a vertical cross sectional view taken through a printing plate milling machine embodying my present invention, Fig. 2 is a horizontal sectional view as seen along the dash-dot line 2—2 of Fig. 1, and Fig. 3 is a fragmentary front elevational view of the machine shown in Fig. 1.

In the drawings I have shown only those portions of a flat-printing-plate milling machine that are essential to the understanding of my invention, and it will be understood that the parts of a complete milling machine which I have not disclosed will be constructed in accordance with the prior art teachings.

In the drawings, numeral 10 designates a supporting frame having vertical side frames 11 and 11', the bottom pedestal of the frame not being shown. Frame 10 supports a movable T-shaped bed 12 on a pair of ways 13—13' and between a pair of side guides 15—15', both the ways and the guides being formed as integral parts of the frame 10.

The bed 12 supports a printing plate P which may be held to the bed 12 by clamps (not shown), and which is prevented from longitudinal movement along the bed 12 by a shoulder 12a formed on the left end (Fig. 3) of the bed 12. The ways 13—13' and guides 15—15' allow the bed 12 to be moved in a direction which is at right angles to the plane of the drawing in Fig. 1 and to the right or left as indicated by the arrow 16 of Fig. 3. This movement of the bed 12 is obtained by a reversible force, for example a reversible motor and suitable control, which forms no part of my present invention and therefore is not disclosed.

The right and left side frames 11 and 11' are provided with vertically disposed cavities 17—17'. The cavity 17 is equipped with a plurality of machine elements including a vertically disposed jack stem 18; a worm gear 19; a worm 21 drivingly engaging the worm gear 19; a portion of a horizontally disposed shaft 22, one end of which is rotatably supported from the frame 11 in a bearing 23 and which has keyed to it the worm 21; a stepped washer 24; coiled spring 26; a bottom cover 27, which is screw held to the bottom of the frame 11; a vertically disposed adjusting screw 28 with lock nut 29; a side cover 31. The left end (Figs. 1 and 2) of the shaft 22 carries an operating wheel 30, which is held to the shaft 22 by the usual key, washer and screw. Jack stem 18 has a cylindrical guide portion 32 which is slidably mounted in a cylindrical guide hole portion 33 of the cavity 17. Directly above each guide 32 the stem 18 has an integrally formed rectangular flange head 34. Below the guide 32 the stem 18 is externally threaded as at 36 and thereby carries the worm gear 19 which has appropriate internal threads for engaging the threads 36 on the stem 18. Directly below the threads 36, the stem 18 has a reduced cylindrical portion 37, the upper part of which carries the stepped washer 24, and the lower part of which is slidably carried in an internal cylindrical guide recess 38 formed in the upper portion of the cover 27. The coiled spring 26 surrounds portions of the washer 24 and the cover 27 and provides a lift for the stem 18 by forcing the washer 24 against the bottom of the threaded portion 36.

The side frame 11 is provided with a downfacing thrust bearing surface 39, and the spring 26 forces the upper side face 41 of the gear 19 against the thrust surface 39. The spring 26 is strong enough to maintain a firm contact at all times between the upper surface 41 of the gear 19 and the thrust surface 39.

The cavity 17', and the elements associated therewith, is, except for a few features later to be described, identical with the cavity 17 and the elements associated therewith. For this reason the cavity 17' and the elements associated therewith will not be described in detail but the same elements of both are designated by the same reference numeral, with a prime (') added, to the numeral associated with cavity 17'.

The points wherein the elements of cavity 17' differ from those of cavity 17 are as follows: First, the two are of opposite hand; second, the cover 31 is provided with a bearing boss 42 which serves to rotatably support the shaft 22 and also holds the worm 21 on the shaft, whereas the cover 31' is plain and the worm 21' is held to the shaft 22 by a screw 43 and a washer 44; thirdly, the washer 24 and therefore the jack stem 18 is supported by one spring 26, whereas the washer 24' and stem 18' are supported by two concentric springs 26' and 26''; fourthly, a pin 46 passes through a hole 47 in the frame 11' an may be made to enter a hole 48 provided in the worm 21'. By loosening the screw 43, the worm 21', for adjustment purposes, may be rotated with respect to the shaft 22. This permits slight vertical adjustment of the jack stem 18' and thereby permits adjusting a cutter 49 presently to be described.

As best seen in Figs. 1 and 3, a bearing block 51 is held by bolts 52 to the head 34 of the jack stem 18. The block 51 has a flat bottom surface that rests on the top of the head 34 and also has a horizontally disposed hole 53 bored therethrough. The hole 53 provides a space into which is inserted a cylindrical bearing cartridge 54, having at one end an inturned flange 56 and at the other end an outturned flange 57. The cavity of the cartridge 54 supports the outer race ring of an antifriction ball bearing 58, and the front of the bearing cavity is closed by a cover 59 having a small diameter collar 61 which enters the bearing cavity of the cartridge 54. The cover 59 is also provided with a centrally located axially extending hole 62, a radial flange 63, and an open faced split ring 64. Bolts 66 hold the flange 63 to the flange 57, and bolts 67 hold the cover 59 and the bearing cartridge 54 to the bearing block 51. An indicator gage 68 is attached to the cover 59 by screws 69 and is protected from injury by the ring 64. The indicator 68 is of conventional form and has a pointer 71 which moves when the stem 72 moves in and out of the indicator. The lower end of the stem 72 engages an upper end of a flat headed screw 73 which is threaded into a lug 74 integral with the frame 11, the screw 73 being held in a predetermined position by a lock nut 76. Thus the gage 68 indicates when and by how much the bearing block 54 is raised or lowered. It will of course be realized that the indicator could be mounted on the frame and the stem 72 be arranged to engage a lug which moves as the cutter 49 is moved.

The right (as seen in Fig. 1) jack stem 18' has a bearing block 51' bolted to it by bolts 52'. This block 51' is provided with a horizontally disposed bore 53' which accommodates the outer race ring of a ball bearing 58', this ring being held in place by a cover 77 and bolts 78. An outwardly extending flange 79 of the block 51 is properly shaped to carry a stator 81 of a motor, the stator being held in place by screws 83. The two infacing portions of the bearing blocks 51 and 51' are joined by a semi-cylindrical guard 84, which prevents accidental contact with the cutter 49. The guard 84 also acts as a shield to guide flying chips into a suction hose 86 secured at one end to a hollow extension formed on the guard 84 and at the other end to suction collecting device, not shown.

A cutter supporting shaft 88 is supported on its left (Fig. 1) by the inner race ring of the ball bearing 58, and on its right by the inner race ring of the ball bearing 58'. The extreme right end of the shaft 88 carries a rotor 89 for the motor stator 81, the rotor being held to the shaft by a key 91, a washer 92 and a bolt 93. A substantially central portion of the shaft is formed into the shape of a frusto-conical collar 94 having a key slot 96, and the portion of the shaft 88 to the left (Fig. 1) of the collar 94 is reduced in cross section and is of cylindrical form. The cutter 49, which may otherwise be of conventional form, has special cone-shaped holes 97 and 97' at its two ends. The cutter 49 is centered and carried on the shaft 88 by having the conical end 97' engage the frusto-conical collar 94 and by having a conically shaped sleeve 98, with four slots 99 equally spaced around its circumference, pressed into the cone-shaped hole 97 of the cutter 49. The sleeve 98 is forced, longitudinally of the shaft 88, by the inner race ring of the ball bearing 58, which in turn is forced along the shaft by a washer 101 and a screw 102, the latter being threaded into the end of the shaft 88.

The operation of the milling machine described above is as follows. Energization of the electric motor 81—89 causes the shaft 88 and the cutter 49 to rotate, and energization and proper control (not shown) of a motor (not shown) causes the bed 12 to move from the left to the right as seen in Fig. 3. Since the plate P is held to the bed 12, the cutter 49 will mill the up-facing reverse side of the plate P, it being understood that the obverse side of plate P rests on the bed 12. The thickness to which the plate P is machined will be indicated by the indicator pointer 71 and can be regulated at will by the operator turing the wheel 30. Turning the wheel 30 clockwise or counterclockwise causes worms 21 and 21' to rotate worm gears 19 and 19' respectively, which action causes the threads of the gears 19 and 19' acting with the threads 36 and 36' of the jack stems 18 and 18' to raise or lower the jack stems as well as the bearing blocks 51 and 51', and therefore to raise and lower the bearings 58—58', the shaft 88 and the cutter 49. The pressure caused by the cutter 49 acting on the plate P causes a cutter pressure reaction on the bearings 58 and 58' which is to the right and upward as seen in Fig. 3. The upward component of this reaction is in the same direction as the force produced by the heavy springs 26, 26' and 26''. The strength of the springs are such that the forces produced by them are far in excess of the forces produced by the weight of the bearings 58 and 58', cutter 49, motor 81—89, etc., and thus the springs provide a firm preloading of the screw threads 36—36' in the worm gears 19 and 19' and assure that the top face of the gears 19 and 19' are always pressed firmly against the bottom of the thrust surfaces 39 and 39' respectively. From this it can be seen that the cutter reaction forces cannot and will not cause a lifting action. Furthermore, once a desired setting has been set, as shown by the indicator 68, the thickness of a plate P being cut will be constant before, during and after the cutting operation.

If it should become desirable to remove and replace the cutter 49, this can be done very rapidly by the following simple operation. First the indicator 68 is removed by removing the screws 69, and then the screws 67 are removed thus detaching the bearing cartridge 54 and its cover 59 from the block 51. Removal of the indicator 68 uncovers the hole 62 in the cover 59. Since the hole 62 is in direct line with the head of the screw 102, the screw can be loosened by the use of a socket wrench (not shown) operating through the hole 68 and engaging a recessed socket in the screw 102. As the screw 102 is loosened, its head engages the inside face of the cover 59 and since the cover 59 is held to the bearing cartridge 54 by screws 66, the loosening of the screw 67 causes the bearing cartridge 54, the bearing 58 and the cover 59 to move as a unit out of the hole 53 in the block 51. This leaves the ball bearing 58 within the cartridge 54 and thus protected from dirt or other injury.

With the hole 53 in the bearing block 51 open, the cone shaped sleeve 98 is removed and the cutter 49 pulled through the hole 53, while the shaft 88 remains in place being held by the right ball bearing 58'.

From the above it is evident that I have provided a novel and greatly improved milling machine for milling printing plates. Among other features, it will be noted that I have provided a backlash free adjusting means for raising and lowering the milling cutter, which means has a direct reading indicator or guage, and which means insures that a setting once set will remain accurately adjusted regardless of the reactive pressure caused by the operation of the milling cutter. It will also be noted that I have provided a mounting for the rotary milling cutter that will insure accurate centering on both ends and which at the same time provides for easy removal and replacement of the cutter. It will be further noted that I have provided a means whereby both sides of the cutter can be adjusted to be accurately parallel.

What I claim as new and desire to secure by Letters Patent of the United States, is:

1. In a milling machine especially adapted for machining the reverse side of a flat printing plate, a frame, a pair of jack stems vertically movable with respect to said frame, a milling cutter rotatably mounted on the upper end of said jack stems, a threaded portion on each of said jack stems, a worm gear threaded on each of said threaded portions, a worm for driving each of said worm gears, a common shaft for simultaneously driving both of said worms, and a pin carried by said frame and arranged to engage one of said worms, whereby, said worm can be held from turning while said other worm is adjustably turned.

2. A milling machine especially designed for machining the reverse side of flat printing plates, comprising a rotatable milling cutter, a pair of vertically disposed jack stems, a threaded portion on each of said jack stems, a pair of anti-friction bearings rotatably mounting said cutter on the top of said jack stems, a worm gear carried by the threaded portion of each of said jack stems, spring means for yieldingly supporting said jack stems, a horizontally positioned thrust surface positioned adjacent each of said worm gears, and a pair of worms for simultaneously turning said worm gears.

3. A milling machine comprising a rotatable milling cutter, a pair of vertically disposed jack stems, a pair of anti-friction bearings rotatably mounting said cutter on said jack stems, a member carried by each of said jack stems, adjusting means for varying the relative position of each of said members with respect to its jack stem, spring means for upwardly biasing each combination of said jack-stem and said member, limiting means for governing the upward movement of each combination of said jack stem and its member, and means for simultaneously varying the relative position of both of said members with respect to their jack stems.

4. A milling machine comprising a rotatable milling cutter, a pair of vertically disposed jack stems, a pair of anti-friction bearings rotatably mounting said cutter on said jack stems, a member carried by each of said jack stems, adjusting means for varying the relative position of each of said members with respect to its jack stem, spring means for upwardly biasing each combination of said jack stem and said member, limiting means for governing the upward movement of each combination of said jack stem and its member, and means for simultaneously varying the relative position of both of said members with respect to their jack stems, and means for stopping the simultaneous varying of the relative position of one of said members while the other said member is adjustably varied.

5. A milling machine especially adapted for machining flat printing plates comprising a rotatable milling cutter; a pair of side frames each having a vertically disposed cavity, and each cavity having a guide hole portion, and a down facing thrust bearing surface; a vertically disposed jack stem in each of said cavities, and each jack stem having a guide portion located in said guide hole, an externally threaded portion located adjacent to said bearing surface, and a reduced cylindrical portion; a pair of antifriction bearings rotatably mounting said cutter on said jack stems; a worm gear carried by said threaded portion of each of said jack stems, and each worm gear having an upper side face engaging one of said thrust bearing surfaces; adjusting means for turning said worm gears with respect to said threaded portions; a washer carried on each of said reduced cylindrical portions below said threaded portions; a compression spring engaging the lower side of each of said washers; and a member engaging the lower end of each of said compression spring and thereby causing said springs to yieldingly support said jack stems.

6. A milling machine especially adapted for machining flat printing plates comprising a rotatable milling cutter; a pair of side frames each having a vertically disposed cavity, and each cavity having a guide hole portion, and a down facing thrust bearing surface; a vertically disposed jack stem in each of said cavities, and each jack stem having a guide portion slidably fitted into said guide hole, an externally threaded portion located adjacent to said bearing surface, and a reduced cylindrical portion; a pair of ball bearings rotatably mounting said cutter on said jack stems; a worm gear screwed to said threaded portion of each of said jack stems, and each worm gear having an up facing thrust surface engaging one of said thrust bearing surfaces; adjusting means for simultaneously turning said worm gears with respect to said threaded portions, a washer carried on each of said reduced cylindrical portions below said threaded portion; a compression spring engaging the lower side of each of said washers; and a member engaging the lower end of each of said compression springs and thereby causing said springs to yieldingly support said jack stems.

7. A machine especially adapted for machining flat printing plates comprising a rotatable milling cutter; a pair of upstanding side frames each having a vertically disposed cavity, and each cavity having a guide hole in its upper portion, and a down facing thrust bearing surface below said guide hole; a vertically disposed jack stem in each of said cavities, and each jack stem having a guide portion positioned in said guide hole, an externally threaded portion below said guide portion and positioned adjacent to said bearing surface, and a reduced cylindrical portion below said threaded portion; a pair of antifriction bearings rotatably mounting said cutter on the upper ends of said jack stems; a worm gear carried by said threaded portion of each of said jack stems, and each worm gear having an upper side face engaging one of said thrust bearing surfaces; adjusting means engaging said worm gear and turning them on said threaded portions, a washer carried on each of said reduced cylindrical portions and being restrained from longitudinal movement on said stems; a compression spring engaging the under portion of each of said washers and forcing each of the washers and stems upwardly; and a bottom cover supporting the other end of said compression spring.

WILLIAM F. HUCK.

References Cited in the file of this patent

UNITED STATES PATENTS

| Number | Name | Date |
|---|---|---|
| 619,501 | Potter | Feb. 14, 1899 |
| 1,479,073 | Howard | Jan. 1, 1924 |
| 1,602,860 | Sleeper | Oct. 12, 1926 |
| 1,623,346 | Johnson | Apr. 5, 1927 |
| 1,825,721 | Forward et al. | Oct. 6, 1931 |
| 1,942,592 | Claybourn | Jan. 9, 1934 |
| 2,171,519 | Belden et al. | Sept. 5, 1939 |
| 2,239,259 | Turrettini | Apr. 22, 1941 |
| 2,239,567 | Nenninger | Apr. 22, 1941 |